United States Patent
Quan

(10) Patent No.: US 11,268,430 B2
(45) Date of Patent: *Mar. 8, 2022

(54) DIFFUSION SURFACE ALLOYED METAL EXHAUST COMPONENT WITH WELDED EDGES

(71) Applicant: Tenneco Automotive Operating Company Inc., Lake Forest, IL (US)

(72) Inventor: Guangchun Quan, Ann Arbor, MI (US)

(73) Assignee: Tenneco Automotive Operating Company Inc., Lake Forest, IL (US)

( * ) Notice: Subject to any disclaimer, the term of this patent is extended or adjusted under 35 U.S.C. 154(b) by 398 days.

This patent is subject to a terminal disclaimer.

(21) Appl. No.: 16/250,419

(22) Filed: Jan. 17, 2019

(65) Prior Publication Data

US 2020/0232378 A1 Jul. 23, 2020

(51) Int. Cl.
*F01N 13/16* (2010.01)
*F01N 13/08* (2010.01)
(Continued)

(52) U.S. Cl.
CPC ............ *F01N 13/16* (2013.01); *B32B 15/011* (2013.01); *C22C 38/18* (2013.01); *C23C 10/04* (2013.01);
(Continued)

(58) Field of Classification Search
None
See application file for complete search history.

(56) References Cited

U.S. PATENT DOCUMENTS

| 1,280,386 A | 10/1918 | Buehner |
| 1,512,961 A | 10/1924 | Weil |

(Continued)

FOREIGN PATENT DOCUMENTS

| CN | 101413419 A | 4/2009 |
| CN | 102230407 A | 11/2011 |

(Continued)

OTHER PUBLICATIONS

International Search Report and Written Opinion regarding PCT/US2018/064897, dated Mar. 21, 2019, 10 pages.

(Continued)

*Primary Examiner* — Xiaobei Wang
(74) *Attorney, Agent, or Firm* — Harness, Dickey & Pierce, P.L.C.

(57) ABSTRACT

An exhaust component for a motor vehicle with improved corrosion resistance, including an internal volume, an inlet for receiving exhaust gas, and an outlet for expelling exhaust gas. The exhaust component includes at least one wall that is made of a diffusion surface alloyed metal sheet. The diffusion surface alloyed metal sheet comprises a secondary metal that is formed to a primary metal substrate by diffusion. A weld bead is applied to at least one of the edges of the diffusion surface alloyed metal sheet for edge protection or to join the edge of the diffusion surface alloyed metal sheet to another diffusion surface alloyed metal sheet. The weld bead includes a high chromium content filler metal to protect the weld bead and the primary metal substrate at the weld joint from corrosion.

13 Claims, 5 Drawing Sheets

(51) Int. Cl.
*F01N 13/18* (2010.01)
*B32B 15/01* (2006.01)
*C22C 38/18* (2006.01)
*C23C 10/04* (2006.01)
*C23C 10/32* (2006.01)

(52) U.S. Cl.
CPC ............. *C23C 10/32* (2013.01); *F01N 13/08* (2013.01); *F01N 13/1888* (2013.01); *F01N 2530/04* (2013.01); *F01N 2530/26* (2013.01); *Y10T 428/12958* (2015.01)

(56) References Cited

U.S. PATENT DOCUMENTS

| | | |
|---|---|---|
| 2,323,955 A | 7/1943 | Wilson |
| 2,692,025 A | 10/1954 | Hamilton |
| 2,940,249 A | 6/1960 | Gospodar |
| 2,975,072 A | 3/1961 | Bryant |
| 3,072,214 A | 1/1963 | Deremer |
| 3,109,510 A | 11/1963 | Phelan |
| 3,209,858 A | 10/1965 | Jettinghoff |
| 3,209,860 A | 10/1965 | Lentz |
| 3,209,862 A | 10/1965 | Young |
| 3,337,939 A | 8/1967 | Parkinson |
| 3,388,769 A | 6/1968 | Martoia |
| 3,420,052 A | 1/1969 | Miller |
| 3,512,607 A | 5/1970 | Hubbell, III |
| 3,583,524 A | 6/1971 | Dubois |
| 3,623,901 A | 11/1971 | Forstmann et al. |
| 3,643,760 A | 2/1972 | Hubbell, III |
| 3,709,320 A | 1/1973 | Hollerl et al. |
| 3,768,987 A | 10/1973 | Forstmann et al. |
| 3,794,139 A | 2/1974 | Hetherington et al. |
| 3,827,529 A | 8/1974 | Frietzsche et al. |
| 3,949,829 A | 4/1976 | Honda et al. |
| 4,064,963 A | 12/1977 | Kaan et al. |
| 4,209,076 A | 6/1980 | Franco et al. |
| 4,359,865 A | 11/1982 | Nakao et al. |
| 4,756,437 A | 7/1988 | Rossi-Mossuti |
| 4,909,348 A | 3/1990 | Harwood et al. |
| 5,052,513 A | 10/1991 | Yoshikawa et al. |
| 5,168,132 A | 12/1992 | Beidl et al. |
| 5,265,420 A | 11/1993 | Rutschmann |
| 5,321,214 A | 6/1994 | Uegane et al. |
| 5,403,557 A | 4/1995 | Harris |
| 5,530,213 A | 6/1996 | Hartsock et al. |
| 5,593,645 A | 1/1997 | Steenackers et al. |
| 5,907,135 A | 5/1999 | Hayakawa et al. |
| 6,341,664 B1 | 1/2002 | Gerber |
| 6,598,581 B2 | 7/2003 | Kempf |
| 6,726,957 B2 | 4/2004 | Niemiec |
| 6,830,847 B2 | 12/2004 | Ramaswami et al. |
| 6,889,499 B2 | 5/2005 | Bassani |
| 7,001,675 B2 | 2/2006 | Chan |
| 7,051,523 B2 | 5/2006 | Kerchner |
| 7,377,359 B2 | 5/2008 | Hofmann et al. |
| 7,506,723 B2 | 3/2009 | Hoerr et al. |
| 7,637,349 B2 | 12/2009 | Harada |
| 7,669,693 B2 | 3/2010 | Yamaguchi et al. |
| 7,789,195 B2 | 9/2010 | Mabuchi et al. |
| 7,874,401 B2 | 1/2011 | Uhlemann et al. |
| 7,942,239 B2 | 5/2011 | Huff et al. |
| 7,967,107 B2 | 6/2011 | Han et al. |
| 8,292,026 B2 | 10/2012 | Tauschek et al. |
| 8,402,756 B2 | 3/2013 | Luce et al. |
| 8,557,397 B2 | 10/2013 | Bullard et al. |
| 8,628,861 B2 | 1/2014 | Bullard et al. |
| 8,684,131 B1 | 4/2014 | Park et al. |
| 8,827,035 B2 | 9/2014 | Ross et al. |
| 9,067,282 B2 | 6/2015 | Sharp |
| 9,095,932 B2 | 8/2015 | Miller et al. |
| 9,096,035 B2 | 8/2015 | Sachdev et al. |
| 9,109,482 B2 | 8/2015 | Fritz et al. |
| 9,121,320 B2 | 9/2015 | Carr et al. |
| 9,341,102 B2 | 5/2016 | Ross et al. |
| 9,393,759 B2 | 7/2016 | Luo et al. |
| 9,429,052 B2 | 8/2016 | Horr |
| 9,623,515 B2 | 4/2017 | Breuer et al. |
| 9,689,301 B2 | 6/2017 | Carr et al. |
| 9,862,058 B2 | 1/2018 | Breuer et al. |
| 2005/0115764 A1 | 6/2005 | Mabuchi et al. |
| 2006/0162995 A1 | 7/2006 | Schorn et al. |
| 2006/0231330 A1 | 10/2006 | Morales et al. |
| 2007/0102236 A1 | 5/2007 | Uhlemann et al. |
| 2007/0227807 A1 | 10/2007 | Meneely et al. |
| 2008/0093161 A1 | 4/2008 | Winkel et al. |
| 2008/0093162 A1 | 4/2008 | Marocco et al. |
| 2008/0196969 A1 | 8/2008 | Henke et al. |
| 2009/0000862 A1 | 1/2009 | Buell et al. |
| 2009/0229913 A1 | 9/2009 | Tonietto et al. |
| 2009/0249603 A1 | 10/2009 | Vargas |
| 2011/0083924 A1 | 4/2011 | Park |
| 2011/0272209 A1* | 11/2011 | Tauschek ............ F01N 13/1844 181/228 |
| 2013/0171471 A1* | 7/2013 | Bullard ................ B05D 3/0254 428/683 |
| 2013/0206271 A1* | 8/2013 | Wieser .................... F16L 58/08 138/143 |
| 2013/0213734 A1 | 8/2013 | Ahn et al. |
| 2014/0027414 A1 | 1/2014 | Lin et al. |
| 2014/0144721 A1 | 5/2014 | Park |
| 2014/0151149 A1 | 6/2014 | Ross et al. |
| 2015/0008068 A1 | 1/2015 | Hamashima et al. |
| 2015/0354421 A1 | 12/2015 | Horr |
| 2016/0340786 A1 | 11/2016 | Mukai et al. |
| 2017/0080523 A1 | 3/2017 | Andersson et al. |
| 2017/0218831 A1 | 8/2017 | DeVouge et al. |
| 2019/0321914 A1* | 10/2019 | Denney ................... B23K 26/24 |
| 2020/0232376 A1 | 7/2020 | Quan |
| 2020/0232377 A1 | 7/2020 | Quan et al. |

FOREIGN PATENT DOCUMENTS

| | | |
|---|---|---|
| CN | 103603707 A | 2/2014 |
| CN | 204163804 U | 2/2015 |
| CN | 103014694 B | 4/2015 |
| CN | 204851384 U | 12/2015 |
| CN | 105813837 A | 7/2016 |
| CN | 205840974 U | 12/2016 |
| CN | 106285879 A | 1/2017 |
| CN | 109079357 A | 12/2018 |
| DE | 2706957 A1 | 8/1978 |
| DE | 2856889 A1 | 11/1980 |
| DE | 2839756 C2 | 8/1984 |
| DE | 102004039006 A1 | 2/2006 |
| DE | 102013106651 A1 | 1/2015 |
| EP | 0047678 A1 | 3/1982 |
| EP | 0328056 A2 | 8/1989 |
| EP | 0523008 B1 | 9/1996 |
| EP | 0808877 B1 | 9/2003 |
| EP | 1918544 A1 | 5/2008 |
| EP | 3112654 A1 | 1/2017 |
| GB | 1393232 A | 5/1975 |
| JP | S6338524 B2 | 8/1988 |
| JP | S63285213 A | 11/1988 |
| JP | 10296090 A | 11/1998 |
| JP | H11140665 A | 5/1999 |
| JP | 2000337126 A | 12/2000 |
| JP | 2006144707 A | 6/2006 |
| JP | 3853903 B2 | 12/2006 |
| JP | 2007308737 A | 11/2007 |
| JP | 2009072695 A | 4/2009 |
| JP | 2009215941 A | 9/2009 |
| JP | 2010255520 A | 11/2010 |
| JP | 2011027038 A | 2/2011 |
| JP | 2011085113 A | 4/2011 |
| JP | 4691707 B2 | 6/2011 |
| JP | 5335595 B2 | 11/2013 |
| JP | 2013238160 A | 11/2013 |
| JP | 5529839 B2 | 6/2014 |
| JP | 2015063985 A | 4/2015 |
| JP | 5992768 B2 | 9/2016 |
| JP | 6443138 B2 | 12/2018 |
| KR | 100797823 B1 | 1/2008 |

(56) References Cited

FOREIGN PATENT DOCUMENTS

| KR | 20090071167 | A  | 7/2009  |
|----|-------------|----|---------|
| KR | 101262612   | B1 | 5/2013  |
| WO | WO-2016206915 | A1 | 12/2016 |
| WO | 201750711   | A1 | 3/2017  |

OTHER PUBLICATIONS

Office Action regarding Chinese Patent Application No. 202010032630. 2, dated Jul. 27, 2021.
Office Action regarding Chinese Patent Application No. 202010032431. 1, dated Jun. 23, 2021.

* cited by examiner

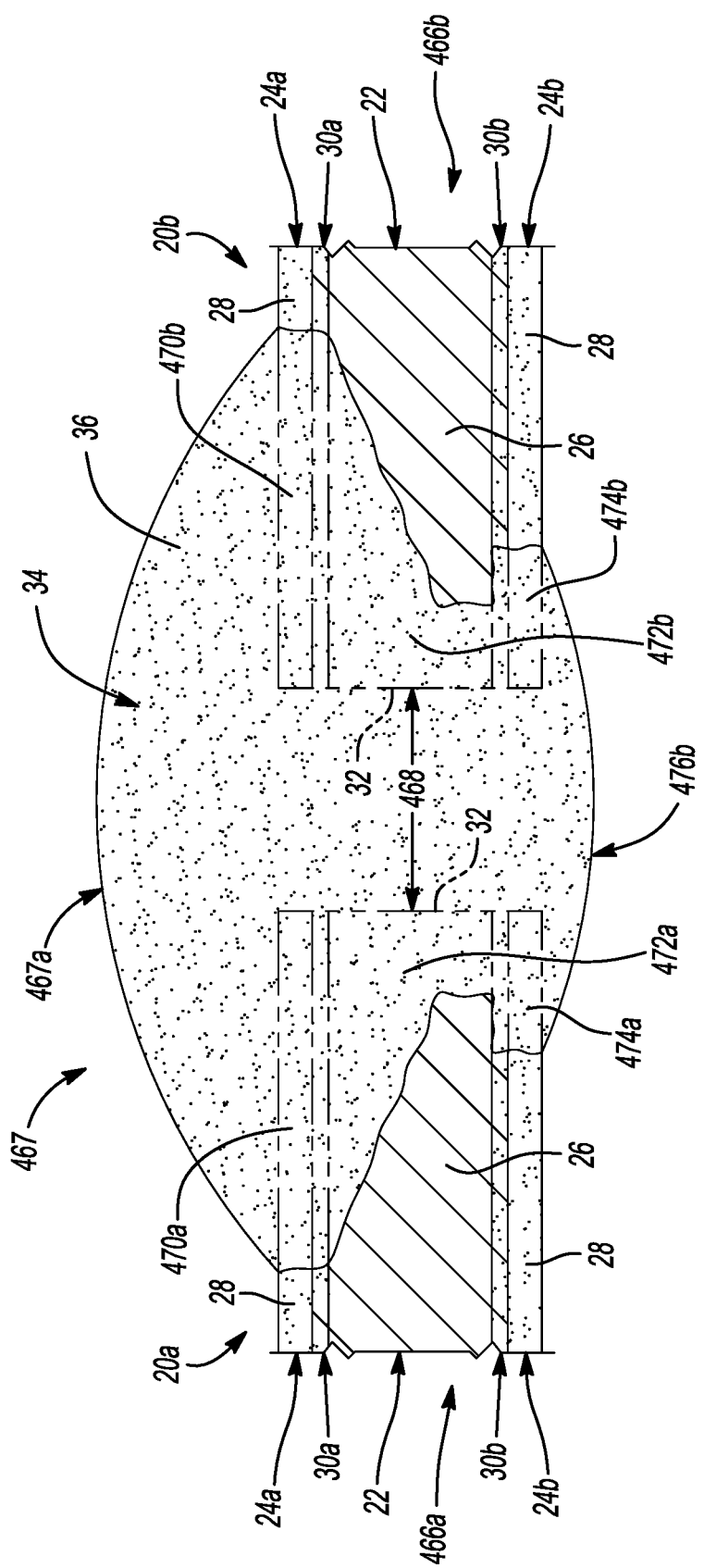

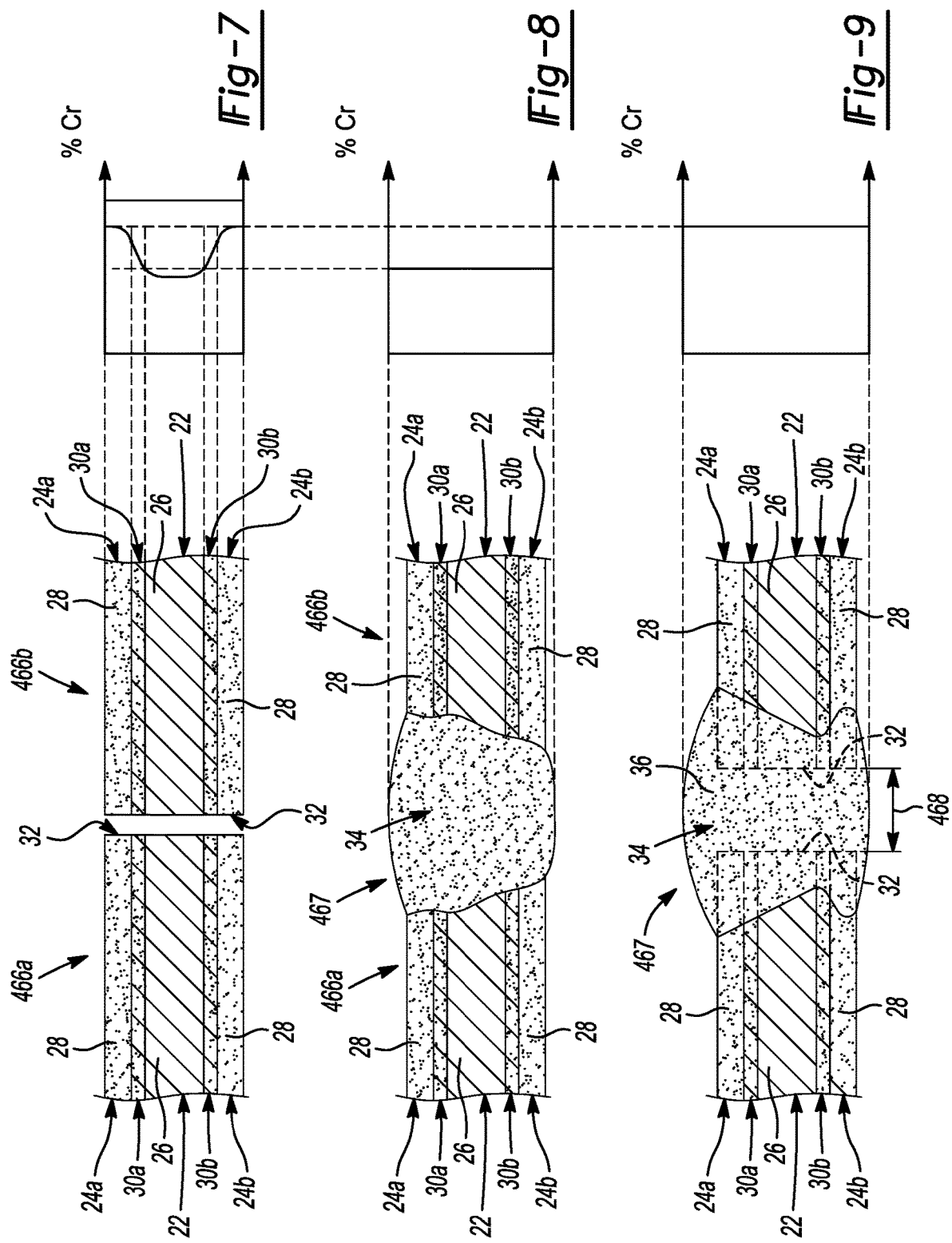

DIFFUSION SURFACE ALLOYED METAL EXHAUST COMPONENT WITH WELDED EDGES

FIELD

The present disclosure relates generally to exhaust components for motor vehicles and more particularly to exhaust components made of diffusion surface alloyed sheet metals.

BACKGROUND

The statements in this section merely provide background information related to the present disclosure and may not constitute prior art.

Motor vehicles typically have an exhaust system that transports hot exhaust gases from an internal combustion engine powering the motor vehicle to the outside environment. Such exhaust systems are typically comprised of various exhaust components, including without limitation, headers, down pipes, x-pipes, exhaust pipes, and mufflers. Depending on the type of fuel source used to power the internal combustion engine in the motor vehicle (e.g., gasoline versus diesel), the exhaust system may include additional exhaust components that provide emissions control, including without limitation, catalytic converters, urea injectors, selective catalytic reduction (SCR) units, diesel oxidation catalysts (DOC), and diesel particulate filters (DPF). Traditionally, these exhaust components have been made from cast iron or steel. These materials work well in high temperature applications, but suffer drawbacks associated with long-term corrosion. The exhaust components of a typical motor vehicle operate in a highly corrosive environment and are prone to corrosion from both the outside and the inside. Exhaust components are typically mounted on the exterior of a motor vehicle, usually underneath the vehicle body and therefore have external surfaces that are exposed to water and salt spray from roadways treated with salt during the winter months. The internal surfaces of an exhaust component are exposed to exhaust gases, which in addition to water vapor, can include urea from a urea injector. The urea, which is used by emission control subsystems, creates a corrosive environment inside the exhaust component.

Today, vehicle manufacturers have different steel requirements for various exhaust components to help resist corrosion. The outside surface of exhaust components must pass salt spray testing. The inside surface of exhaust components must pass urea corrosion testing if the exhaust components are to be used in diesel engine applications. Some alternatives to cast iron and steel have been developed that use coatings or surface cladding to reduce corrosion. High cost alloys and stainless steels have also been developed that offer improved corrosion resistance to salt and urea. However, other cost effective alternatives with improved corrosion resistance are still needed.

Even though metals that have coatings or surface cladding typically have superior corrosion resistance compared to cast iron or steel, problems can arise when welds are applied. Welds typically penetrate the coating or surface cladding and extend into the base metal substrate. Therefore, during welding operations the molten pool of metal in the weld area includes material from the coating or surface cladding, the base metal substrate, and a filler metal (e.g., weld stick or weld wire) if one is used. Because the base metal substrate is typically much thicker than the coating or surface cladding, a large percentage of the material in the molten pool of metal in the weld area is the base metal substrate. The result is that along the weld bead, the base metal substrate substantially dilutes the corrosion resistant metal from the coating or surface cladding. The weld bead therefore may become an entry point for corrosion when two sheets of metal with a coating or cladding are welded together. Accordingly, there remains a need in exhaust component applications for improved weld joint corrosion resistance.

SUMMARY

This section provides a general summary of the disclosure, and is not a comprehensive disclosure of its full scope or all of its features.

In accordance with an aspect of the present disclosure, an exhaust component for a motor vehicle with improved corrosion resistance is provided. The exhaust component includes an internal volume, an inlet, and an outlet. The inlet is disposed in fluid communication with the internal volume and is configured to receive exhaust gas. The outlet is also disposed in fluid communication with the internal volume and is configured to expel exhaust gas. The exhaust component includes one or more walls. At least one of the walls of the exhaust component is made of a diffusion surface alloyed metal sheet. The diffusion surface alloyed metal sheet comprises a secondary metal that is formed on a primary metal substrate by diffusion processes. Cutting, stamping and/or other manufacturing operations leave the primary metal substrate of the diffusion surface alloyed metal sheet exposed along one or more edges. Some of these exposed edges terminate in the internal volume of the exhaust component or terminate in an external zone positioned outside the exhaust component. These edges are left exposed to exhaust gases, water vapor, urea, and other corrosives in the internal volume and to water, salt, and other corrosives in the external zone positioned outside the exhaust component. In order to protect the primary metal substrate at the exposed edges of the diffusion surface alloyed metal sheet from corrosion, a weld bead is applied to the exposed edges of the diffusion surface alloyed metal sheet. The weld bead covers the exposed edges such that the primary metal substrate at the exposed edges is protected from exposure to the internal volume or the external zone by the weld bead. The weld bead may include a filler material with a high chromium content such that the weld bead itself is corrosion resistant, much like the secondary metal in the diffusion surface alloyed metal sheet.

Because the one or more edges of the diffusion surface alloyed metal sheet are covered by the weld bead, the edges are isolated from the external zone and the exhaust chamber and therefore are not exposed to salt spray and/or urea. This prevents salt and/or urea from corroding the primary metal substrate at the edges of the diffusion surface alloyed metal sheet, which would otherwise be exposed absent this arrangement. In other words, the corrosion resistant secondary metal of the diffusion surface alloyed metal sheet and the weld bead work together to protect/seal the primary metal substrate from coming into contact with water, salt spray, and/or urea.

In accordance with another aspect of the present disclosure, the exhaust component further includes a housing with one or more outer walls that define the internal volume. The one or more outer walls have an inside surface facing the internal volume and an outside surface facing the external zone. The exhaust component may further include one or more inner walls positioned in the internal volume of the housing that define an exhaust chamber within the internal volume. At least part of one of the outer walls or one of the inner walls is made of a diffusion surface alloyed metal sheet constructed in accordance with the description set forth above.

In accordance with yet another aspect of the present disclosure, the exhaust component includes first and second walls that are joined together at a weld seam. Each of the first and second walls are made of a diffusion surface alloyed metal sheet comprising at least one cover layer of secondary metal that is formed to a core layer of primary metal substrate by a diffusion process. The primary metal substrate in the core layers of the first and second walls has a primary metal chromium content and the secondary metal in the cover layers of the first and second walls has a secondary metal chromium content. The secondary metal chromium content is greater than the primary metal chromium content, which makes the secondary metal in the cover layers more corrosion resistant to salt, water, and urea than the primary metal substrate. A weld bead is positioned between the first and second walls, which joins the first wall to the second wall at the weld seam. The weld bead has a weld bead chromium content that varies less than 3 percent from the secondary metal chromium content. In other words, there is little variance between the chromium content of the cover layers in the first and second walls and the chromium content of the weld bead. This results in a weld bead that resists corrosion and protects the primary metal substrate on each side of the weld joint from corrosion.

BRIEF DESCRIPTION OF THE DRAWINGS

Other advantages of the present disclosure will be readily appreciated, as the same becomes better understood by reference to the following detailed description when considered in connection with the accompanying drawings wherein:

FIG. 6 is an enlarged, fragmentary cross-sectional view of two of the diffusion surface alloyed metal sheets shown in FIG. 1 that have been joined at a weld seam;

FIG. 7 is a fragmentary cross-sectional view of two of the diffusion surface alloyed metal sheets shown in FIG. 1 arranged next to one another prior to welding;

FIG. 8 is another fragmentary cross-sectional view of two of the diffusion surface alloyed metal sheets shown in FIG. 1 after welding where no gap was provided between the edges of diffusion surface alloyed metal sheets; and FIG. 9 is another fragmentary cross-sectional view of two of the diffusion surface alloyed metal sheets shown in FIG. 1 after welding where a gap was provided between the edges of the diffusion surface alloyed metal sheets and a chromium rich weld wire was used.

DETAILED DESCRIPTION

Figure 1:
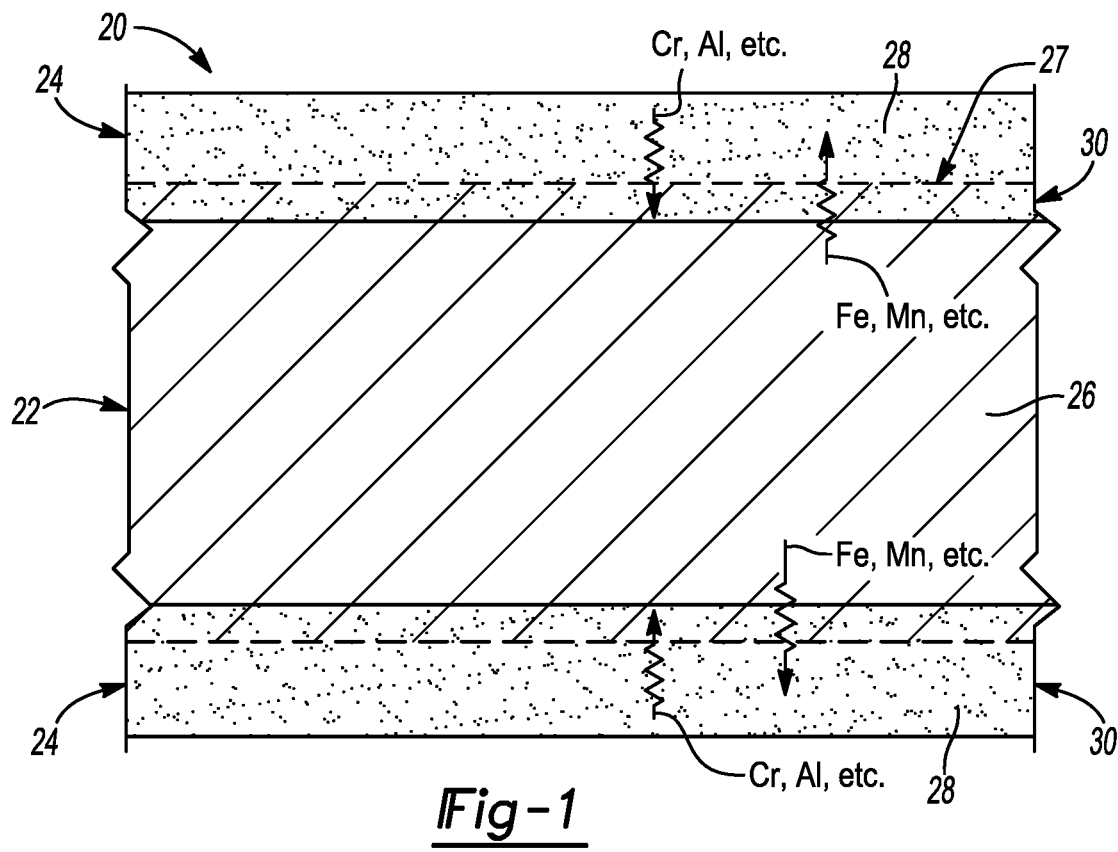
FIG. 1 is an enlarged, fragmentary cross-sectional view of a diffusion surface alloyed metal sheet constructed in accordance with the present disclosure with an exposed edge.

Referring to the Figures, wherein like numerals indicate corresponding parts throughout the several views, various exhaust components 110, 210, 310 for motor vehicles are illustrated where at least part of each exemplary exhaust component is constructed from a diffusion surface alloyed metal sheet 20.

Example embodiments will now be described more fully with reference to the accompanying drawings. Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

FIG. 1 is an enlarged cross-sectional view of a diffusion surface alloyed metal sheet 20. The diffusion surface alloyed metal sheet 20 in this illustration is comprised of a core layer 22 that is positioned between two cover layers 24. The core layer 22 is made of a primary metal substrate 26 such as carbon steel or stainless steel having a chromium content of approximately 10 percent. The cover layers 24 cover at least part of original substrate surface 27 of the primary metal substrate 26. The cover layers 24 are made of a secondary metal 28 and are formed by surface diffusion of chromium (Cr) into the metal substrate 26. In embodiments where the primary metal substrate 26 is a stainless steel having a primary metal chromium content of at least 10 percent, the stainless steel can be either ferritic stainless steel or austenitic stainless steel. It should be appreciated that the stainless steel is different from carbon/low carbon steels, which have a chromium content that is well below 10 percent. The secondary metal 28 in the core layers 24 is a chromium rich metal or chromium rich alloy having a chromium content of at least 20 percent. The diffusion surface alloyed metal sheet 20 includes two transition zones 30 positioned between the core layer 22 and the cover layers 24, which are formed by inward-diffusion of the supplied elements, e.g. chromium (Cr) and/or aluminum (Al), into the metal substrate 26 and outward-diffusion of the elements from the primary metal substrate 26, e.g. iron (Fe) and manganese (Mn). Within the transition zone 30 a molecular concentration of the secondary metal 28 gradually decreases and a molecular concentration of the primary metal substrate 26 gradually increases moving toward the core layer 22. As a result, there is a gradual change in the chemistry, and properties of the diffusion surface alloyed metal sheet 20 in the transition zones 30. It should be appreciated that the two cover layers 24 may be made of the same secondary metal 28 or alternatively the cover layer 24 on one side of the core layer 22 may be made of a first secondary metal 28 while the cover layer 24 on the opposing side of the core layer 22 is made of a second secondary metal 28 that is different than the first secondary metal 28. It should also be appreciated that diffusion surface alloyed metal sheet 20 could alternatively include one cover layer 24 on just one side of the core layer 22.

There are a variety of manufacturing processes that can be used to form the diffusion surface alloyed metal sheet 20. In one exemplary process for creating metallurgically bonded metal, the chromium in the secondary metal 28 is applied in a slurry system to a sheet of the primary metal substrate 26. The sheet of the primary metal substrate 26 with the slurry is then rolled up and heated (baked) using an oven or other heating equipment. The combination of the slurry configuration, controlled atmosphere, and heat leads to formation of the secondary metal 28. It should be appreciated that diffusion surface alloyed metal sheets 20 are different from hot dip coated or cladded metal sheets. Hot dip coated or cladded metal sheets include an outer layer that remains mostly as supplied and the bond between the base metal substrate and the outer layer is highly localized. As a result, the molecular concentration of the outer layer material and the base metal substrate change abruptly at the boundary between the outer layer material and the base metal substrate. There is no transition zone where the chemistry, and properties of the metal sheet change gradually between the layers. The distinct layers bonded together with a sharp interface can cause a loose adhesion, which further impacts durability, especially during forming operations that are performed post-coating/cladding. This problem can be avoided with diffusion surface alloyed metal sheets 20.

The secondary metal 28 in the diffusion surface alloyed metal sheet 20 described herein has a higher chromium content than the carbon steel or stainless steel forming the primary metal substrate 26 such that the secondary metal 28 is more corrosion resistant to salt and urea than the carbon steel or stainless steel forming the primary metal substrate 26. However, to use diffusion surface alloyed metal sheets 20 in exhaust components, the diffusion surface alloyed metal sheets 20 must be cut, stamped, or undergo other manufacturing or forming operations that leave one or more edges 32. Depending upon the construction of the exhaust component, one or more of these edges 32 may be left as an exposed edge 32, meaning that the edge 32 does not abut (i.e., is not covered up or sealed by) any other wall or other structure of the exhaust component. Such exposed edges 32 may therefore be exposed to either exhaust gases or the outside environment. The exposed edges 32 of a diffusion surface alloyed metal sheet 20 provide an entry point for corrosion where the primary metal substrate 26 of the core layer 22 is left exposed (i.e., uncovered by the secondary metal 28).

Figure 2:
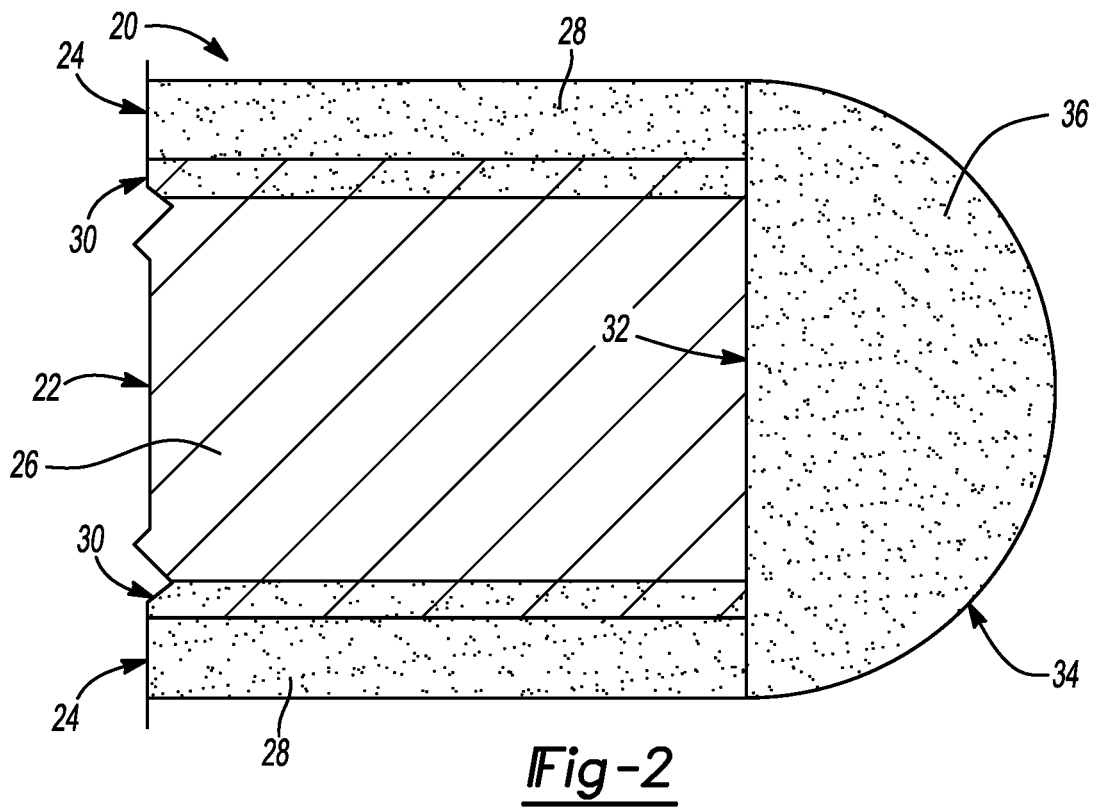
FIG. 2 is another enlarged, fragmentary cross-sectional view of the diffusion surface alloyed metal sheet shown in FIG. 1 where a weld bead has been applied to cover the exposed edge.

As shown in FIG. 2, the diffusion surface alloyed metal sheet 20 disclosed herein includes a weld bead 34 that extends along and covers one or more of the exposed edges 32 of the diffusion surface alloyed metal sheet 20. The weld bead 34 prevents corrosion from occurring at the one or more exposed edges 32 of the diffusion surface alloyed metal sheet 20 by covering (i.e., sealing) the primary metal substrate 26 along the exposed edges 32. The secondary metal 28 together with the weld bead 34 isolate the primary metal substrate 26 of the diffusion surface alloyed metal sheet 20 from corrosive environments, including the outside environment (water and salt spray) and exhaust gases (water vapor and urea). The weld bead 34 includes a filler metal 36, which may be provided by a weld stick or weld wire during the welding operation. For example, filler metal 36 from the weld stick or weld wire may melt and combine with the primary metal substrate 26 from the core layer 22 and the secondary metal 28 from the cover layers 24 in a molten pool of metal created during welding. The filler metal 36 is configured to have greater corrosion resistance than the primary metal substrate 26. For example, the filler metal 36 may have a chromium content (a filler metal chromium content) that is greater than the chromium content of the primary metal substrate 26 (the primary metal chromium content).

Optionally, the filler metal 36 may be selected to closely match the corrosion resistance and other physical properties or characteristics of the secondary metal 28 in the cover layers 24. For example, the filler metal 36 in the weld bead 34 may be the same material as the secondary metal 28 in the cover layers 24 or may alternatively have a chromium content (a filler metal chromium content) that is higher than the chromium content of the secondary metal 28 (the secondary metal chromium content). By way of example and without limitation, the primary metal substrate 26 in the core layer 22 of the diffusion surface alloyed metal sheet 20 may be a stainless steel with a chromium content (primary metal chromium content) of approximately 10 percent chromium, the secondary metal 28 in the cover layers 24 may be a metal alloy with a chromium content (secondary metal chromium content) of approximately 20 percent chromium, and the filler metal 36 in the weld bead 34 may have a chromium content (filler metal chromium content) of approximately 26 percent chromium.

Figure 3:
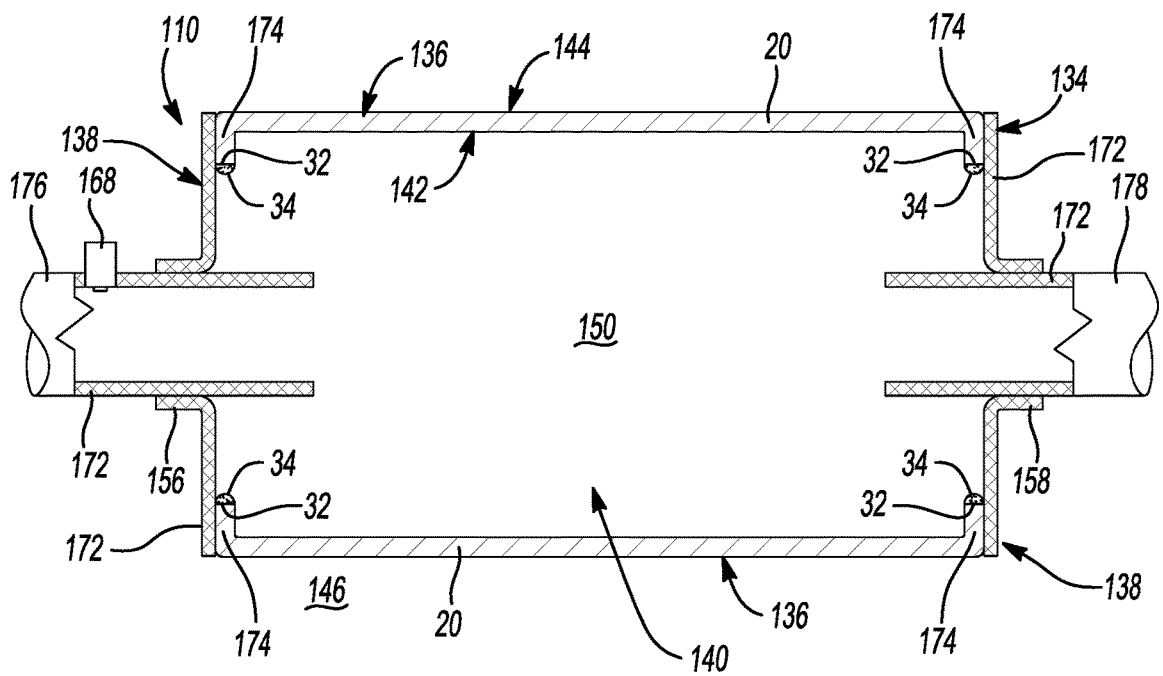
FIG. 3 is an exemplary exhaust component constructed in accordance with the present disclosure, where part of the exhaust component is constructed from the diffusion surface alloyed metal sheet shown in FIG. 2.

The exhaust component 110 shown in FIG. 3 includes a housing 134 with an outer wall 136 that is made from the diffusion surface alloyed metal sheets 20 shown in FIG. 2. The housing 134 includes two end walls 138 that cooperate with the outer wall 136 to define an internal volume 140 of the housing 134. The outer wall 136 has an inside surface 142 facing the internal volume 140 of the housing 134 and an outside surface 144 facing an external zone 146 that is positioned outside the housing 134. The exhaust component 110 further includes an inlet conduit 176 that extends into a flanged inlet opening 156 in the housing 134 and an outlet conduit 178 that extends into a flanged outlet opening 158 in the housing 134. The internal volume 140 defines the exhaust chamber 150 therein and the inlet conduit 176 and the outlet conduit 178 are arranged in fluid communication with the exhaust chamber 150.

A urea injector 168 is placed in the inlet conduit 176. The urea injector 168 is configured to inject urea (e.g., liquid $NH_3$ or gaseous $NH_3$) into the flow of exhaust gases passing through the exhaust chamber 150. This urea is utilized in an emission control process for the treatment of diesel engine exhaust that takes place in a selective catalytic reduction (SCR) unit.

Although other configurations are possible, the end walls 138 of the housing 134 and the inlet conduit 176 and the outlet conduit 178 are made of a urea and salt resistant metal 172 such as 309 austenitic stainless steel or 439 stainless steel. The outer wall 136 of the housing 134 is made of a diffusion surface alloyed metal sheet 20. As previously described, the diffusion surface alloyed metal sheet 20 includes a secondary metal 28 that is chemically bonded to a primary metal substrate 26 by metallic bonds. The diffusion surface alloyed metal sheet 20 forming the outer wall 136 has exposed edges 32 that are oriented toward and are exposed to the internal volume 140 of the housing 134. Specifically, the exposed edges 32 of the diffusion surface alloyed metal sheet 20 forming the outer wall 136 are bent inwardly into the exhaust chamber 150 at an angle of approximately 90 degrees to form inwardly turned flanges 174. Accordingly, the primary metal substrate 26 at the exposed edges 32 of the diffusion surface alloyed metal sheet 20 is protected from exposure to salt in the external zone 146. Meanwhile, the weld bead 34 extending along the exposed edges 32 protects the primary metal substrate 26 in the core layer 22 of the diffusion surface alloyed metal sheet 20 from exposure to the urea in the exhaust chamber 150.

Figure 4:
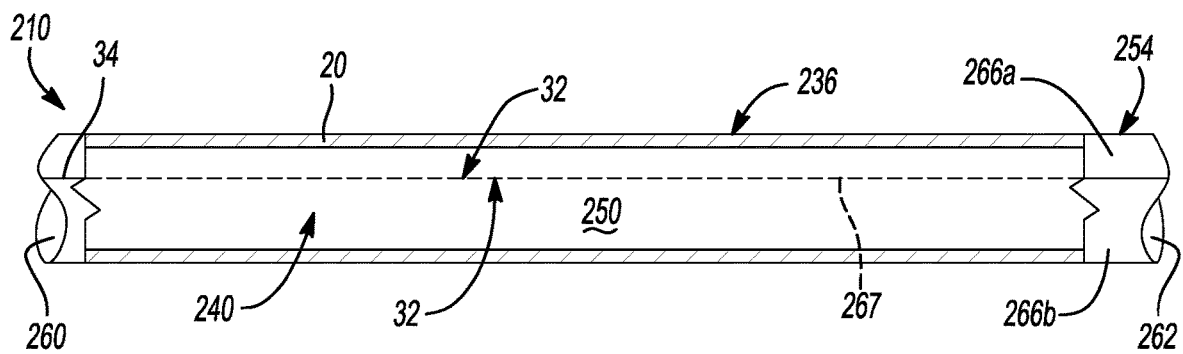
FIG. 4 is another exemplary exhaust component constructed in accordance with the present disclosure, where the exhaust component is constructed from the diffusion surface alloyed metal sheet shown in FIG. 1.

The exhaust component 210 shown in FIG. 4 is a typical exhaust pipe. The exhaust component 210 includes an internal volume 240, an inlet 260, and an outlet 262. The inlet 260 is disposed in fluid communication with the internal volume 240 and is configured to receive exhaust gas. The outlet 262 is also disposed in fluid communication with the internal volume 240 and is configured to expel exhaust gas. The exhaust component 210 includes an outer wall 236. The outer wall 236 is provided in the form of a tube 254 and is made of the diffusion surface alloyed metal sheet 20 described above in connection with FIG. 1. The tube 254 defines an exhaust chamber 250 therein that extends between the inlet 260 and the outlet 262. Although the tube 254 may be manufactured in numerous ways, in one non-limiting example, a diffusion surface alloyed metal sheet 20 can be rolled into tube 254 where two opposing edges 32 of the diffusion surface alloyed metal sheet 20 forming first and second walls 266a, 266b are joined (i.e., welded) together at a weld seam 267 (i.e., a weld joint). As will be explained in greater detail below, the weld seam 267 includes a weld bead 34 that is positioned between the first and second walls 266a, 266b. The weld bead 34 joins (i.e., holds) the first and second walls 266a, 266b together and has substantially the same corrosion resistance and other properties/characteristics as the secondary metal 28 in the cover layers 24 of the diffusion surface alloyed metal sheet 20.

Figure 5:
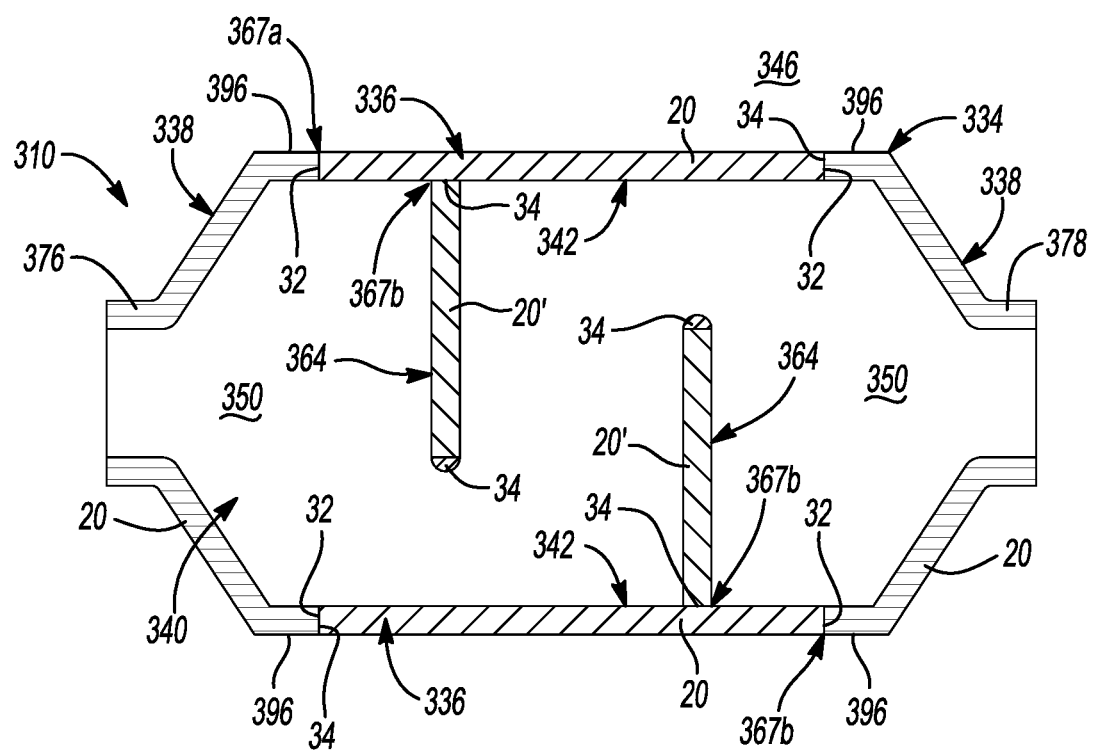
FIG. 5 is another exemplary exhaust component constructed in accordance with the present disclosure, where the exhaust component is constructed from the diffusion surface alloyed metal sheets shown in FIGS. 1 and 2.

FIG. 5 illustrates an alternative configuration for an exhaust component 310 that includes end walls 338 that have a frusto-conical (i.e., funnel) shape. The exhaust chamber 350 occupies the entire internal volume 340 of the housing 334. The end walls 338 include flanges 396 that abut the outer wall 336 of the housing 334. The end walls 338 and the outer wall 336 of the housing 334 are made of the diffusion surface alloyed metal sheet 20 described above in connection with FIG. 1 and joined (i.e., welded) together at weld seams 367a that form a butt-joint (i.e., a butt-weld).

Optionally, one or more partitions 364 may be installed inside the internal volume 340 of the housing 334. For example, the partitions 364 may be joined (i.e., welded) to the inside surface 342 of the outer wall 336 at weld seams 367b that form a fillet-joint (i.e., a fillet-weld). The partitions 364 may be made from a different diffusion surface alloyed metal sheet 20'. The secondary metal 28 in the diffusion surface alloyed metal sheet 20 forming the outer wall 336 and end walls 338 may be selected to be more corrosion resistant to salt and urea than the primary metal substrate 26 in the core layer 22. The secondary metal 28 in the diffusion surface alloyed metal sheet 20' forming the partitions 364 is selected to be more corrosion resistant to urea than the primary metal substrate 26 in the core layer 22. In other words, the secondary metal 28 used in the diffusion surface alloyed metal sheets 20 forming the outer wall 336 and the end walls 338 can be selected particularly for its corrosion resistance to salt and urea while the secondary metal 28 used in the diffusion surface alloyed metal sheets 20' forming the partitions 364 can be selected particularly for its corrosion resistance to urea. The result is an exhaust component 310 with walls 336, 338, 364 made of diffusion surface alloyed metal sheets 20, 20' that are tailored to the different corrosive environments in the external zone 346 outside the housing 334 and the exhaust chamber 350 inside the housing 334.

It should be appreciated that the flanges 396 of the end walls 338 and the outer wall 336 form first and second walls that are joined (i.e., welded) together at weld seam 367a and the partitions 364 and the outer wall 336 form first and second walls that are joined (i.e., welded) together at weld seam 367b. As will be explained in greater detail below, each weld seam 367a, 367b includes a weld bead 34 that is positioned between the flange 396 of an end wall 338 and the outer wall 336 or between a partition 364 and the outer wall 336. Each weld bead 34 has substantially the same corrosion resistance and other properties/characteristics as the secondary metal(s) 28 in the cover layers 24 of the diffusion surface alloyed metal sheets 20, 20'.

FIG. 6 illustrates a cross-section of an exemplary weld seam 467 between first and second walls 466a, 466b, each made from a diffusion surface alloyed metal sheet 20. Although the exemplary weld seam 467 shown in FIG. 6 is illustrated as a butt-joint (i.e., butt-weld), the same principles described herein apply to fillet-joints (i.e., fillet-welds). The edges 32 of the first and second walls 466a, 466b are spaced apart by a gap 468. The weld bead 34 is positioned in (i.e., penetrates through) the gap 468 between the first and second walls 466a, 466b. The heat produced during the welding operation, such as during plasma welding, causes the edges 32 of the first and second walls 466a, 466b to melt on each side of the gap 468. In the illustrated example, the weld torch was positioned above the gap 468 between the first and second walls 466a, 466b and a weld stick or weld wire was used to supply a filler metal 36 to the weld bead 34. As shown in FIG. 6, heat from welding causes first and second portions 470a, 470b of the secondary metal 28 in the proximal cover layers 24a of the first and second walls 466a, 466b to melt. Heat from welding also causes first and second portions 472a, 472b of the primary metal substrate 26 in the core layers 22 of the first and second walls 466a, 466b to melt. Finally, heat from welding causes first and second portions 474a, 474b of the secondary metal 28 in the distal cover layers 24b of the first and second walls 466a, 466b to melt. As a result, the weld bead 34 contains percentages of the filler metal 36, the primary metal substrate 26, and the secondary metal 28.

FIG. 7 illustrates the first and second walls 466a, 466b prior to welding. The plot on the right-side of FIG. 7 illustrates the chromium content of the first and second walls 466a, 466b in relation to the thickness of the first and second walls 466a, 466b. The chromium concentration in the core layers 22 of the first and second walls 466a, 466b is lower than the chromium concentration in the cover layers 24a, 24b. As explained above, the chromium concentration gradually increases in the transition zones 30a, 30b moving from the core layers 22 to the cover layers 24a, 24b. FIG. 8 illustrates what happens when the first and second walls 466a, 466b are welded together with no gap between the edges 32 of the first and second walls 466a, 466b. The plot on the right-side of FIG. 8 illustrates the chromium content of the weld bead 34 between the first and second walls 466a, 466b in relation to the thickness of the weld bead 34. Because the primary metal substrate 26 in the core layers 22 of the first and second walls 466a, 466b is much thicker than the secondary metal 28 in the cover layers 24a, 24b of the first and second walls 466a, 466b, the primary metal substrate 26 accounts for a larger percentage of the material in the weld bead 34 than the secondary metal 28. The primary metal substrate 26 substantially dilutes the secondary metal 28 in the weld bead 34 and as a result the chromium content in the weld bead 34 is much lowered than the chromium content in the cover layers 24a, 24b and only slightly higher than the chromium content in the core layers 22. As a result, the corrosion resistance of the weld bead 34 is less than the corrosion resistance of the cover layers 24a, 24b, making the weld bead 34 a potential entry point for corrosion.

FIG. 9 illustrates what happens when the first and second walls 466a, 466b are welded together with a gap 468 between the edges 32 of the first and second walls 466a, 466b. The plot on the right-side of FIG. 9 illustrates the chromium content of the weld bead 34 between the first and second walls 466a, 466b in relation to the thickness of the weld bead 34. By providing a gap 468 between the first and second walls 466a, 466b so that a lesser amount of primary metal substrate 26 from the core layers 22 of the first and second walls 466a, 466b melts into the weld bead 34 and by selecting a filler metal 36 that has a greater chromium content (filler metal chromium content) than the chromium content of the secondary metal (secondary metal chromium content), a weld bead 34 is formed having a chromium content (weld bead chromium content) that varies less than 3 percent from the chromium content of the secondary metal 28 (the secondary metal chromium content) in the cover layers 24a, 24b of the first and second walls 466a, 466b.

By way of example and without limitation, the primary metal substrate 26 in the core layers 22 of the diffusion surface alloyed metal sheets 20 forming the first and second walls 466a, 466b may be made of a stainless steel with a chromium content (primary metal chromium content) of approximately 10 percent chromium. The secondary metal 28 in the cover layers 24a, 24b may be made of a metal alloy with a chromium content (secondary metal chromium content) of approximately 20 percent chromium, and the filler metal 36 in the weld bead 34 may have a chromium content (filler metal chromium content) of approximately 26 percent chromium. The result is that the weld bead 34 has a chromium content (weld bead chromium content) of approximately 20 percent chromium across external weld bead surfaces 476a, 476b. As a result, the chromium content and therefore the corrosion resistance along the proximal and distal cover layers 24a, 24b of the first and second walls 466a, 466b and across the external weld bead surfaces 476a, 476b is substantially uniform and uninterrupted. The weld bead 34 therefore does not provide an entry point for corrosion.

The chromium content of the weld bead 34 may or may not be uniform across the width and depth (i.e., thickness) of the weld seam 467. Because the present disclosure is focused on corrosion resistance, the weld bead chromium content is measured at the external weld bead surfaces 476a, 476b and does not vary more than 3 percent from the chromium content of the secondary metal 28 in the cover layers 24a, 24b.

It should be appreciated that the specific percentages listed above for chromium content in the primary metal substrate 26, the secondary metal 28, and the filler metal 36 will change based upon the geometry of the diffusion surface alloyed metal sheets 20 and parameters of the welding operation. For example, the width of the gap 468, the thickness of the core layers 22, and the thickness of the cover layers 24a, 24b all impact the percentage of chromium content needed in the filler metal 36. Similarly, welding parameters such as feed rate, temperature of the weld torch, and the melting point of the primary metal substrate 26 and the secondary metal 28 all impact the percentage of chromium content needed in the filler metal 36. Therefore, it should be appreciated that the percentages listed above for the primary metal substrate 26, the secondary metal 28, and the filler metal 36 are merely exemplary and have been provided for illustration purposes.

Many other modifications and variations of the present disclosure are possible in light of the above teachings and may be practiced otherwise than as specifically described while within the scope of the appended claims.

What is claimed is:

1. An exhaust component for a motor vehicle, comprising:
an internal volume;
an inlet disposed in fluid communication with said internal volume for receiving exhaust gases;

an outlet disposed in fluid communication with said internal volume for expelling exhaust gases;

at least one wall made of a diffusion surface alloyed metal sheet comprising a secondary metal that is formed to a primary metal substrate by diffusion;

said diffusion surface alloyed metal sheet including at least one exposed edge that terminates in and is exposed to said internal volume or an external zone positioned outside said exhaust component; and a weld bead extending along and covering said at least one exposed edge of said diffusion surface alloyed metal sheet such that said primary metal substrate at said at least one exposed edge of said diffusion surface alloyed metal sheet is protected from exposure to said internal volume or said external zone by said weld bead, wherein said primary metal substrate has a primary metal chromium content and said secondary metal has a secondary metal chromium content that is greater than said primary metal chromium content, wherein said weld bead is made of a filler metal that has a filler metal chromium content that is greater than said secondary metal chromium content.

2. The exhaust component set forth in claim 1, wherein said diffusion surface alloyed metal sheet includes a core layer made of said primary metal substrate that is positioned between two cover layers made of said secondary metal.

3. The exhaust component set forth in claim 2, wherein said diffusion surface alloyed metal sheet includes transition zones between said core layer and said cover layers where a molecular concentration of said secondary metal gradually decreases and a molecular concentration of said primary metal substrate gradually increases moving toward said core layer.

4. The exhaust component set forth in claim 2, wherein said diffusion surface alloyed metal sheet includes transition zones between said core layer and said cover layers where a molecular concentration of chromium gradually decreases moving toward said core layer.

5. An exhaust component for a motor vehicle, comprising:
a housing including at least one outer wall defining an internal volume of said housing;

said at least one outer wall having an inside surface facing said internal volume of said housing and an outside surface facing an external zone positioned outside of said housing;

at least one inner wall positioned in said internal volume of said housing that defines an exhaust chamber within said internal volume;

at least part of one of said outer and inner walls being made of a diffusion surface alloyed metal sheet comprising a secondary metal that is formed to a primary metal substrate by diffusion;

said diffusion surface alloyed metal sheet including at least one exposed edge that terminates in and is exposed to said internal volume or said external zone; and a weld bead extending along and covering said at least one exposed edge of said diffusion surface alloyed metal sheet such that said primary metal substrate at said at least one exposed edge of said diffusion surface alloyed metal sheet is protected from exposure to said internal volume or said external zone by said weld bead, wherein said primary metal substrate has a primary metal chromium content and said secondary metal has a secondary metal chromium content that is greater than said primary metal chromium content, wherein said weld bead is made of a filler metal that has a filler metal chromium content that is greater than said secondary metal chromium content.

6. The exhaust component set forth in claim 5, wherein said diffusion surface alloyed metal sheet includes a core layer made of said primary metal substrate that is positioned between two cover layers made of said secondary metal.

7. The exhaust component set forth in claim 5, wherein said filler metal chromium content is at least 20 percent chromium.

8. The exhaust component set forth in claim 6, wherein said diffusion surface alloyed metal sheet includes transition zones between said core layer and said cover layers where a molecular concentration of said secondary metal gradually decreases and a molecular concentration of said primary metal substrate gradually increases moving toward said core layer.

9. An exhaust component for a motor vehicle, comprising:
an internal volume;

an inlet disposed in fluid communication with said internal volume for receiving exhaust gases;

an outlet disposed in fluid communication with said internal volume for expelling exhaust gases;

first and second walls joined together at a weld seam;

each of said first and second walls being made of a diffusion surface alloyed metal sheet comprising at least one cover layer of secondary metal that is formed to a core layer of primary metal substrate by diffusion;

said primary metal substrate in said core layers of said first and second walls having a primary metal chromium content;

said secondary metal in said cover layers of said first and second walls having a secondary metal chromium content that is greater than said primary metal chromium content; and a weld bead positioned between said first and second walls that joins said first wall to said second wall at said weld seam, said weld bead containing a filler metal having a weld bead chromium content that is greater than said secondary metal chromium content of said cover layers in said first and second walls.

10. The exhaust component set forth in claim 9, wherein said filler metal chromium content is at least 20 percent chromium.

11. The exhaust component set forth in claim 10, wherein said primary metal in said core layers of said first and second walls is stainless steel and said primary metal chromium content of said core layers in said first and second walls is at least 10 percent chromium.

12. The exhaust component set forth in claim 9, wherein said filler metal in said weld bead, said primary metal in said core layers, and said secondary metal in said cover layers are intermixed with one another at said weld joint and additively create said weld bead chromium content, which is within 3 percent of said secondary metal chromium content of said cover layers in said first and second walls.

13. The exhaust component set forth in claim 9, wherein said first and second walls are spaced apart at said weld seam by a gap and said weld bead is positioned in and fills said gap between said first and second walls to join said first wall to said second wall at said weld seam.

* * * * *